July 5, 1966  P. JORDAN, JR  3,259,435
SPRING MODULE
Filed Feb. 10, 1964  4 Sheets-Sheet 2
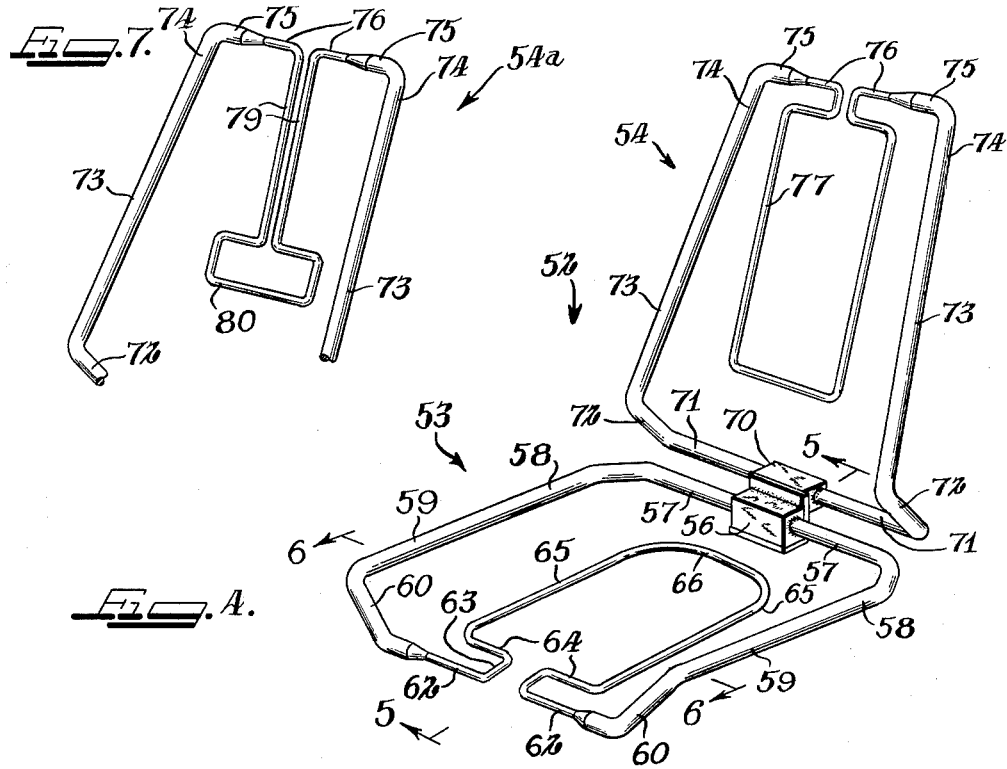
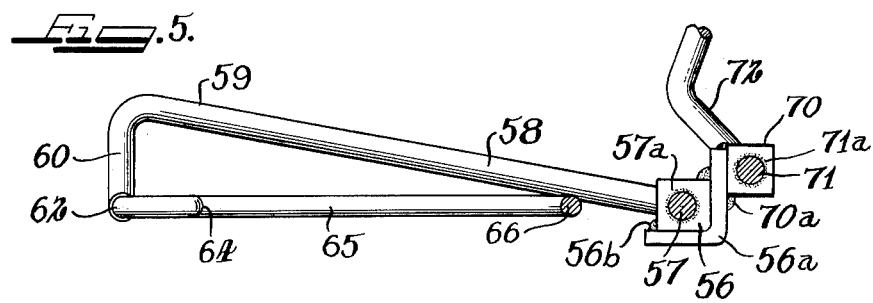
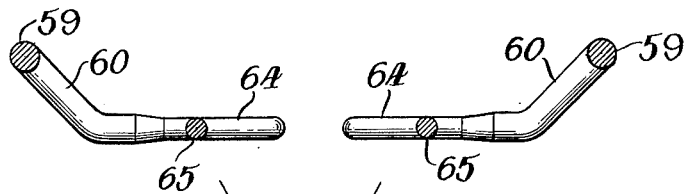
INVENTOR
PAULINUS JORDAN, JR
BY Fidler, Bradley, Patnaude
and Petherbridge  Attys.

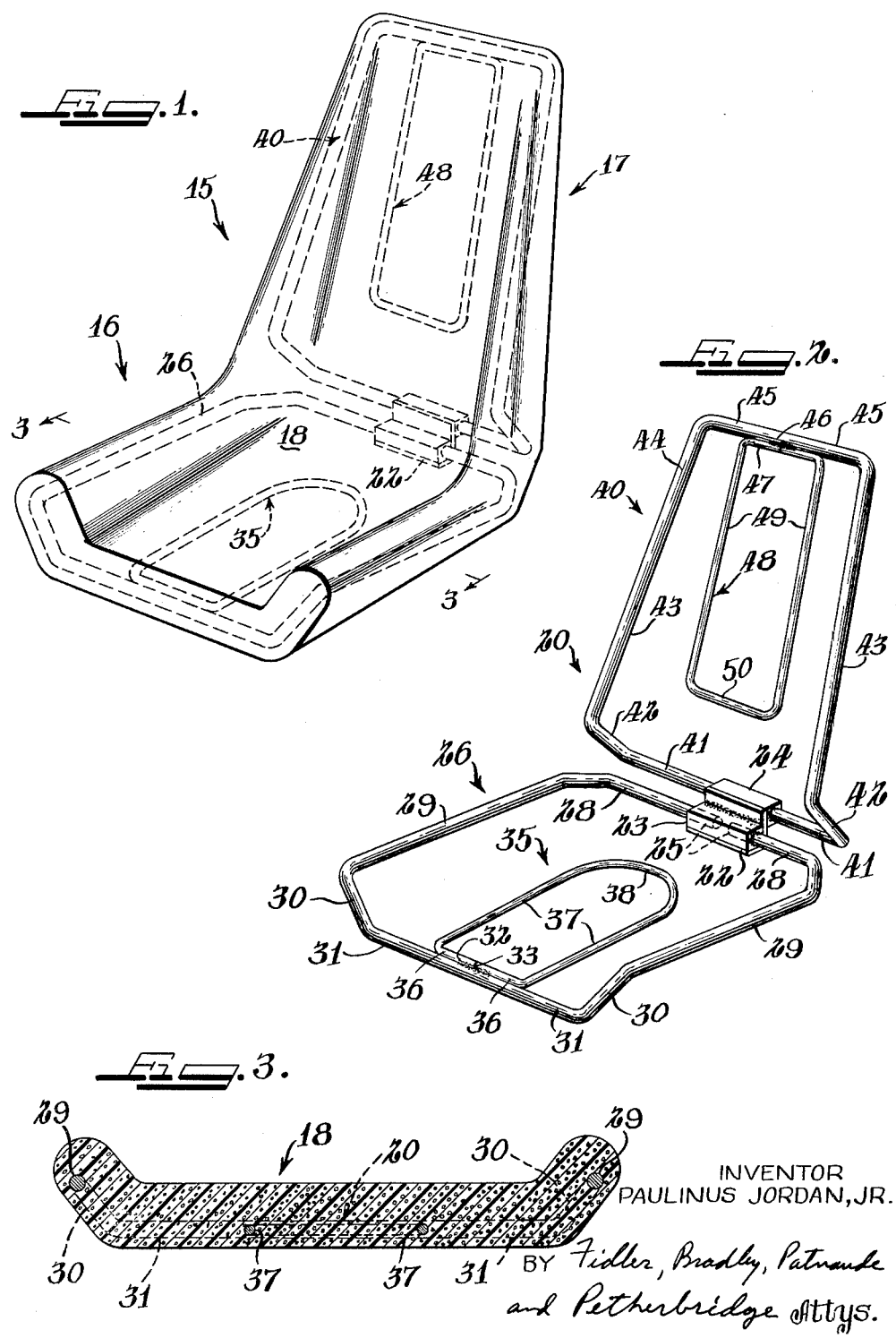

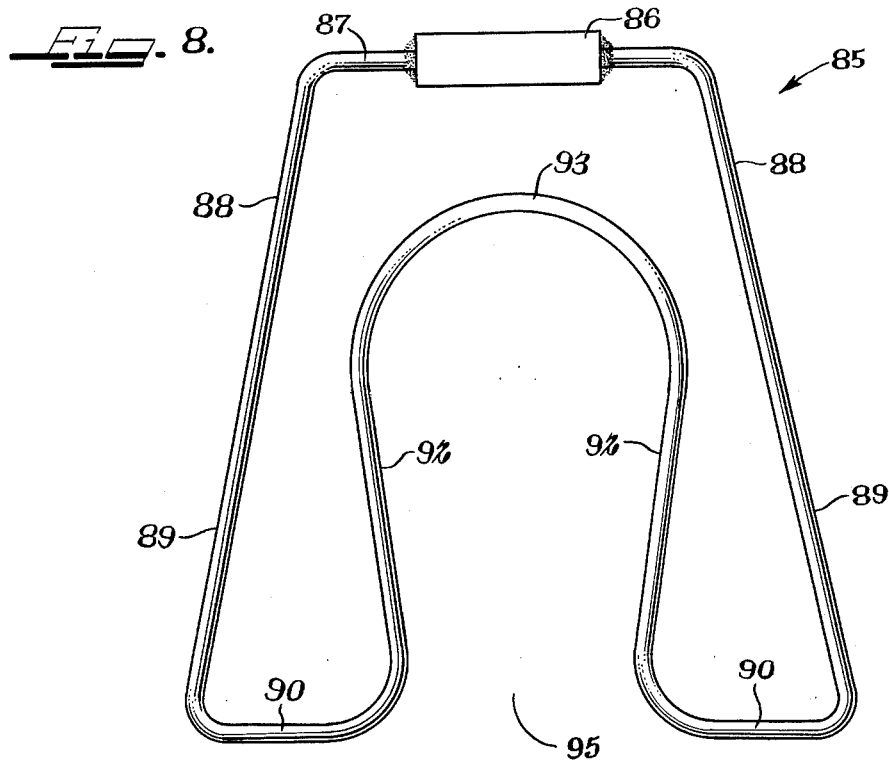
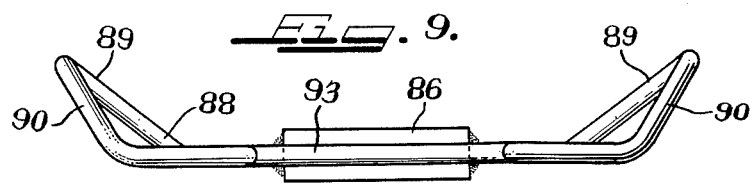
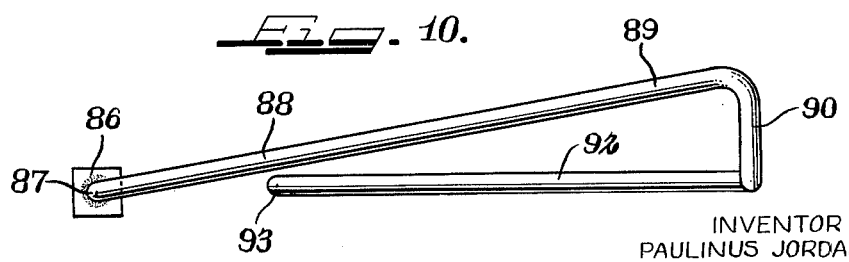

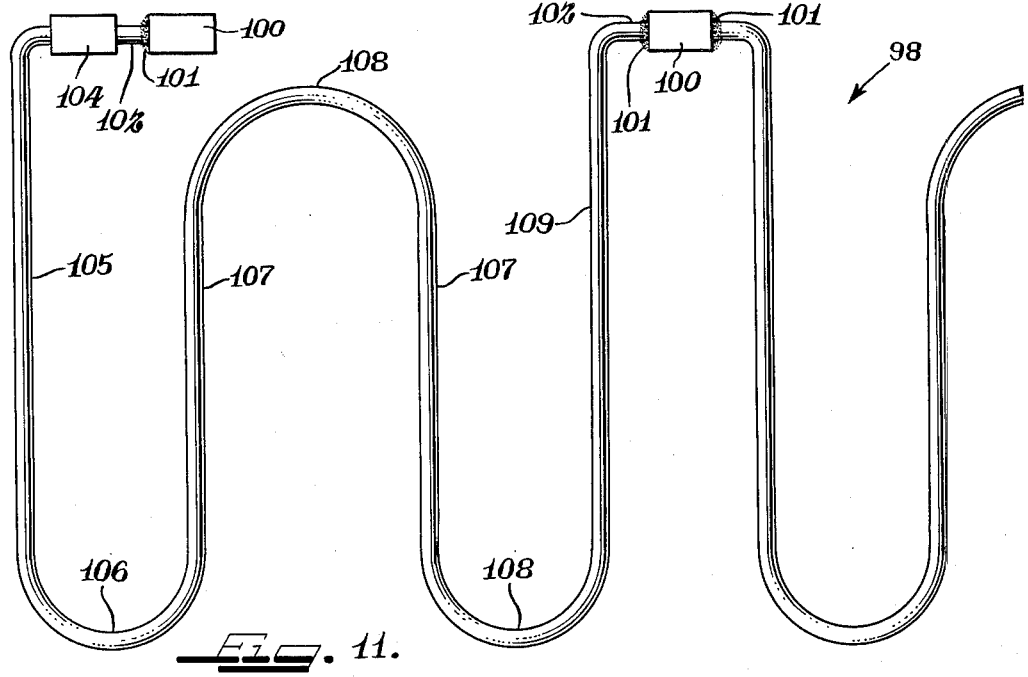
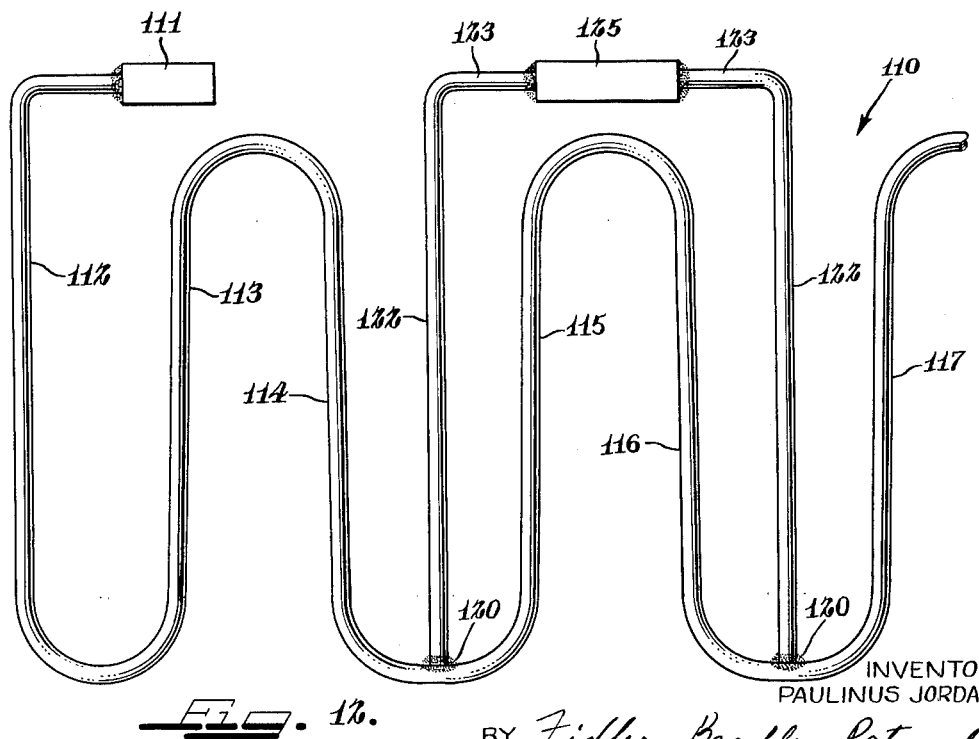

United States Patent Office 3,259,435
Patented July 5, 1966

3,259,435
SPRING MODULE
Paulinus Jordan, Jr., Roseville, Mich., assignor, by mesne assignments, to United States Steel Corporation, Pittsburgh, Pa., a corporation of Delaware
Filed Feb. 10, 1964, Ser. No. 343,798
4 Claims. (Cl. 297—455)

The present invention broadly relates to new spring modules; more specifically to springs constructed and arranged to attenuate random frequency vibrations; more particularly to spring and mounting apparatus therefor for providing different frequencies of inherent vibrations for various weights supported thereby; and still more particularly to spring modules favorably adapted for vehicle seat use, but having numerous other capabilities.

This invention is characterized by new systems of connected torsion-cantilever spring components arranged to provide at least two spaced points or areas with natural, but different, frequencies of spring-mass vibration for at least one predetermined range of masses, or weights. The construction and arrangement of the components is such that at least two of the frequencies of vibration are not only out of linearly comparable time-phase relationship, but are physically constrained to non-linear functional relationship. Random frequency shock forces acting on the system at different points or areas thereof are out-of-phase attenuated substantially completely, and harmonic frequency vibrations are highly damped even at one or more of the inherent spring-mass forced component frequencies.

In keeping with this invention, the spring can be fabricated from spring-steel bar stock; rather than from wire gauge stock in accordance with conventional prior practice. The vehicle seat springs to be described below are fabricated from round bar stock of approximately one-half inch diameter, for example. However, other sizes and shapes may prove more practicable for this and other uses of the spring.

The bar stock is sinuously arranged to provide torsion and cantilever spring components. Spring components may be secured to a suitable support and be formed as a module for a seat part. The ends of at least some of the lengths of bar stock comprise mounting means for the seat part cooperable with the support. The body support surface, of the seat part is in contact with and preferably formed around the spring components.

Vehicle seat parts constructed from these steel bar stock springs are quite thin compared to present conventional seat parts fabricated from steel wire springs and separately framed with supports. Because of the relatively few parts comprising a seat, the same is rendered less costly to manufacture and lighter in weight. In addition, the smaller space occupied by seat parts can afford more space for passenger occupancy and greater degrees of seat adjustment, or the like.

Accordingly it is a broad object of this invention to provide a spring module.

It is another broad object of this invention to provide new spring apparatus for attenuating vibrations or shocks.

Another object is to provide a new spring for vehicle seats and furniture, or the like.

A further object in keeping with the above objects is to provide spring apparatus having only a few essential parts.

An object in keeping with the object next above is to provide a spring made of relatively large sized metal stock.

A further object in keeping with the preceding object is to provide a spring made of spring steel bar stock.

Another object is to provide a new spring seat wherein spring components frame and/or form a skeleton for the seat.

A further object in keeping with the above objects is to provide a new vehicle seat of equal carrying capacity but of less physical volume than prior vehicle seats.

The foregoing, and other features, objects and advantages of the present invention will be either obvious or pointed out in the following specification and claims read in view of the accompanying drawings, in which:

FIG. 1 is a perspective view of a vehicle seat including a seat module;
FIG. 2 is a perspective view of the module;
FIG. 3 is a sectional view taken substantially on line 3—3 of FIG. 1;
FIG. 4 is a perspective view of a modified module;
FIG. 5 is a sectional view taken substantially on line 5—5 of FIG. 4;
FIG. 6 is a sectional view taken substantially on line 6—6 of FIG. 4;
FIG. 7 is a partial view of another modified module;
FIG. 8 is a plan view of a modified seat bottom module;
FIG. 9 is an elevation of the bottom of FIG. 8;
FIG. 10 is a left side view of FIG. 8;
FIG. 11 is a plan view of a left-side half of a wide seat bottom or back-rest module; and
FIG. 12 is a plan view of half of a modified wide module.

Before referring specifically to the drawings for details of construction, a few of the general attributes of the invention will be pointed out. Each of the modifications has spring modules adapted to conveniently define the volume of component parts of seats, or entire seats of dimensions depending upon the characteristics of the seat padding. A seat modification, to be disclosed in detail below, includes what is known in the automotive seat art as a biscuit of substantially constant density porous polyurethane having therein an elastomer such as a synthetic rubber to render it strong, soft and resilient. It is considered desirable to keep the volume of such biscuits at a suitable minimum while still providing comfortable and evenly distributed reaction points of seat parts against the body of the occupant thereof. Each of the modules is arranged so as to define both framing and support parts within the frame for supporting and reacting with respect to the resilient cover. Such action and reaction are that due to spring-mass forced excursions of the torsion-cantilever spring arrangement of the module and the reaction of the supported weight through plastic, so as to provide a resilient and shock absorbing, and hence comfortable, seat.

The modules to be described in detail hereinbelow are each fabricated from steel bar stock and, as a specific example only, such stock may be C–1095 steel which is subject to heat treatment and tempering in conventional manner to attain desirable spring characteristics. While not shown in the drawings, in applications wherein it is desired that the total weight of a seat is to be kept at a minimum, suitable spring steels or alloys thereof in tubular form may be used. Such steels, although being only substantially a little larger in external diameters, provide substantially the same torsion-cantilever spring function while reducing the total weight of the steel by approximately two-thirds as compared with bar stock steel.

Each seat includes a mount which can be substantially at a single point or along a line of points preferably adjacent the bottom rear edge of the seat. Although not shown, the mount is usable with suitable ways for guiding the seat for adjustment forwardly and rearwardly and/or up and down. In addition, the mounts can be fabricated for back-rest tilting movement, not shown, as is conventional with vehicles of the two-door type having front and rear seats.

Referring now in detail to the different figures of the drawings, and first to FIGS. 1, 2 and 3, a preferred modification of a (not tiltable back-rest) bucket seat 15 is shown. The bucket seat 15 comprises a bottom seat portion 16 and a back-rest portion 17. These portions comprise a polyurethane cover in the form of a biscuit 18 foamed-in-place over a module 20, FIG. 2, and shown in dotted lines in FIG. 1. The biscuit 18 is unitary in this modification and covers both the seat bottom part 16 and the back-rest part 17.

Referring to FIG. 3, the polyurethane biscuit 18 has a total thickness T of substantially two inches, with approximately one-half inch of the biscuit material lying below the centerline of the bar stock forming the module 20 and approximately one and one-half inches of the biscuit lying above the centerline of the stock of the module 20. It has been found that substantially only this thickness of two inches for the biscuit 18, with only four legs of the module 20 spaced transversely to form side frames and center support members, is sufficient to provide a comfortable seat when occupied for several hours under relatively rough traveling conditions wherein shocks are encountered frequently.

The back-rest portion 17 of the seat has a substantially identical cross-section and is of substantially the same thickness T, although this dimension may be somewhat less in the back-rest while still providing a suitable degree of comfort. Of course, it is to be understood that different biscuits 18 may have different inherent shock distributing characteristics. However, the preferred biscuit of polyurethane further provides suitable vibration dissipating characteristics as well as soft and resilient qualities found to be desirable in vehicle seats.

Referring again to FIG. 2, the module assembly 20 comprises a mounting bracket 22 that may be in the form of an angle bar, for example, secured to suitable mounting ways, not shown, secured to the floor of a vehicle or other suitable support surfaces. Either the bottom or back flanges of the bar may be exposed, and conveniently support the module assembly 20 in the mold, not shown, for the biscuit 18 for the seat 15. In the case of a chair, the bracket 22 may be attached to suitable legs, not shown. The bracket 22 secures as by bolts, or weldments or the like, a pair of substantially identical transversely bored blocks 23 and 24. As shown in dotted lines, the block 23 is adapted to receive ends 25 of a seat forming spring module 26.

The seat forming portion 26 of the seat spring module 20 is identical around each of its transverse sides, each of which comprises a torsion leg 28, a cantilever leg 29, an offset leg 30 and a second cantilever leg 31 welded as at 32 to one end 33 of a sub-module spring 35 for supporting the center portion of the seat part 16, FIG. 1. The cantilever legs 31 are formed as a beam of a single piece of bar stock in this modification. However, they may be separate and not centrally connected in a manner akin to modifications described below. The sub-module 35 comprises a pair of torsion legs 36, a pair of cantilever legs 37 and a return bend 38.

While different of the legs 28, 29, 31, 36 and 37 are referred to as either torsion or cantilever legs, it is to be understood that the spring stresses are composite in these legs and that each of them has certain degrees of both cantilever and torsion stress characteristics. However, it is of significance in considering the modules that the length and angular arrangements of these legs contribute spring rates or constants which are inherently out of phase for spring-mass vibration with relationship to each other. Accordingly, in the presence of a given load, or mass, represented by the weight of the body supported on the seat part 16, the different spring components will be inherently constrained to vibrate naturally in the presence of a distributing force in a predetermined time phase. Because the several components are time phased differently, and further because the several components are caused to interact of an angle with respect to one another, the inter-molecular stress of torsional vibration with relationship to cantilever stress will, in this spring shape, set up node points wherein vibrations of one component with respect to another will be out of time-phase relationship and accordingly be vibration damping with respect to one another. Because of the arrangement and dimensions of parts, in each of the modules, there are several of such spring sub-components having different rates, but primarily two are considered essential for accomplishing desirable shock attenuation attributes.

The legs 28, 29, 30 and 31 are fabricated from the above-mentioned steel, preferably, and are made of substantially 5/8" diameter bar stock. The legs 36, 37 and return bend 38 are made of the same steel, but are substantially 7/16" in diameter. With such dimensioned bar stock, the torsion legs 28 are preferably at least three inches long, and the torsion legs 36 at least four inches long to minimize seat "hardness." When tubular stock is used, it is preferred that each of the external diameters be increased to an extent whereby the elastic modules thereof will substantially duplicate that of solid bar stock. Inasmuch as both moduli of the component stock depend upon multiple power functions of the stock diameters, it is convenient to accurately calculate for such change and accordingly determine the precise dimensions required for a given stock.

The securement block 24 is connected to a back-rest spring module 40 and is identical on each of its transverse sides. Each half comprises a torsion leg 41, a forwardly offset leg 42, a cantilever leg 43 having a torsion portion 44 and a cantilever leg 45 secured as by welding 46 to a torsion leg 47 of a sub-module 48. The sub-module 48 has a pair of torsion legs 49 and a connecting leg 50 of smaller diameter bar stock than legs 41 through 45, which smaller diameter can be 3/8 of an inch, for example, for the back-rest module 40. As mentioned above, the cover biscuit 18 for the spring module 40 may be foamed-in-place unitarily with the cover for the module 26. However, to provide for different adjustable kinds of mounting devices 23 and 24, the seat parts 16 and 17 can be foamed-in-place separately where desirable, as for hinge mounted seat backs, for example.

Referring now to FIGURES 4, 5 and 6, a modified spring module 52 is shown having a seat bottom module 53 and a seat back module 54. Each of the modules 53 and 54 is formed of a single piece of steel bar stock which is worked either hot or cold in the center portion thereof so that the framing outer legs of the modules are of relatively greater diameter bar stock than the portions of the modules supporting center portions of both a seat bottom part 53 and a seat back part 54. As mentioned above, module 52 is also conducive to having the biscuit, not shown, foamed-in-place over the entire module 52; or the modules 53 and 54 can have the biscuits foamed separately thereon as desired.

The bottom seat module 53 is identical about each transverse half, and has ends of the bar forming it welded in a securing block 56. A torsion leg 57 extends transversely and is connected with a cantilever portion 58 extending into a torsion portion 59 connected to a downwardly and inwardly extending cantilever leg 60 in turn connected to a smaller diameter cantilever portion 62 which is bent inwardly in a leg 63 connected to a torsion leg 64 connected to a cantilever leg 65 connected with a return bend 66 to an opposite torsion leg 65.

The back-rest module 54 is secured to a block 70 connected with a torsion leg 71 connected to a forwardly offset leg 72 to a cantilever leg 73 having an upper torsion portion 74 connected to a cantilever portion 75 which is reduced in a leg part 76 which secures a torsion leg 77 of smaller diameter substantially the same as the diameter of the legs 64 of the bottom seat module 63. Both transverse sides of the back-rest module 54 are identical and accordingly further description is unnecessary.

Referring to FIG. 5 for details of a mount for each of the above modifications, the securing block 56 is secured to an angle bar 56a by welds 56b. The torsion bars 57 are secured as by welds 57a to the mounting block 56. The mounting block 70 is secured to the angle bar 56a by welds 70a and the torsion bar 71 is secured in the mounting block 70 by a weld 71a. As mentioned above, the angle bar 56a can be secured to any suitable support surface.

Referring now to FIG. 7, a modification of the back-rest module 54 is indicated at 54a. All parts identical to the parts shown in FIG. 4 bear identical reference characters. The legs 76, however, terminate in cantilever legs 79 terminating in a loop 80 forming a back-rest support area for the sacroiliac area of the human anatomy for exerting a substantial but low spring rate reaction in this area. It is considered to be an advantage of this invention that it is possible by arranging the several components into somewhat different but substantially similar configurations in both the back-rest portions and in the seat bottom portions to permit seats to be readily adapted for different purposes or desires of users of the seats.

The modules of the type shown in the modification of FIGS. 4 and 7 differ somewhat functionally from each other as well as from the function of those modules disclosed in FIGS. 1, 2 and 3, and it is possible with the modules shown in FIGS. 4 to 7 to provide for a softer seat although fabricated of substantially the same gauges or sizes of bar stock. As shown the modifications shown in FIGS. 4 and 7 require an intermediate rolling or forming operation, or gauge change weldments, not required in connection with the stock used in the modification shown in FIGS. 1, 2 and 3. However, by selecting between these modifications and other modifications to be described hereinbelow, a wide range and variety of modules is available for different end uses, such as vehicle use, furniture uses, and the like.

Referring now to the modification shown in FIGS. 8, 9 and 10, a module 85 herein shown is a seat bottom module, although the same could be arranged in the manner of FIGURES 1, 4 and 7 likewise to form back-rest modules supported on a securing bracket or bar 86. The module 85 may be formed of substantially one-half inch diameter steel bar stock of the type mentioned above and has ends, not shown, welded to the mounting block 86. Each transverse half of the module 85 is identical and only one half will be explained in detail. A torsion leg 87 is connected with a cantilever leg 88 having a torsion portion 89 connected to a downwardly and inwardly extending cantilever-torsion leg 90 connected to a cantilever leg 92 connected with a return bend 93 connecting the opposite side of the module 85. This module 85 has a front gap 95 therein which may be differently spaced than shown to provide greater or lesser degrees of reaction to the backs of the thighs of the occupant of the seat. This modification has a particular advantage in being formed of a single size of bar stock throughout and it is to be understood that different configurations than shown could be used for at least the legs 92 and 93 to provide for different spring constants in this part as desired.

Referring now to FIGS. 11 and 12, and first to FIG. 11, one half of a wide seat is shown. These seats are of the kind normally used as rear seats in automobiles, and in both front and rear seats of 4-door automobiles. For each half of the seat, a pair of mounting blocks 100 are provided. The blocks 100 may conveniently be channel portions, not shown, to receive and secure as by weldments 101 cantilever legs 102 of the module 98. To attain desirable edge support and resiliency in the left-hand edge (and right-hand edge, not shown) a bearing block 104 is provided for the torsion leg 102 adjacent the left-hand end block 100. The torsion leg 102 is connected with cantilever leg 105 in turn connected to torsion legs 106 connected with cantilever legs 107 and return bends 108 to opposite bends 107. An internal cantilever leg 109 connects with the intermediate torsion 102 connected with the intermediate block 100 between the transverse ends of the seat.

The modification shown in FIG. 12 comprises a module 110, only the left half thereof being shown. Each end of the module 110 terminates in a weld securement to a mounting block 111. Bar stock is generally sinusoidally formed into respective torsion and cantilever legs 112, 114, 115, 116 and 117, in each half of the wide seat module 110. Intermediate points 120 of the sinusoidally wound bar stock are secured to ends of bars 122 connected to torsion bars 123 secured in mounting blocks 125, only one of which is shown, there also being a right-hand block, not shown, identical to the left-hand block 125.

Each of the wide seat modules 98 and 110 provides favorable characteristics for certain applications, but each has the inherent characteristic of defining along its front, rear and side edges support areas for a biscuit, not shown, foamed-in-place thereon with substantially only 25 percent of the polyurethane below the modules and approximately 75 percent of the biscuit secured to tops of the modules.

OPERATION

With each of the modifications described above, when in vehicle use, vibration or shock forces usually originate in the vehicle and are transferred to mounting blocks that support the modules. Upon each shock, because there is a spring-mass relationship between the occupant of a seat and the mount for the module, there is a tendency for a reaction following the laws of hamonic motion. As is well known, a spring-mass system may be forced to establish resonant harmonic vibration by application of forced motion at a time rate in phase with the system. Such motions can be encountered on certain roads in an automobile because of spacing of joints between road slabs or "washboard" conditions of road surfacing material. Different vehicle speeds and different weights of occupants will modify such conditions also.

The spring module alone supporting a load over a central sub-module will tend to receive a shock, or series of shocks, through the mount and experience an excursion and return according to the spring-mass constant of the system. By the construction and arrangement of the different parts of the spring system comprising the modules explained above, there are at least two non-harmonic spring constants between the mounting means and the central point of support of a body on the sub-module at the center of the seat part. Because the spring is long, and in addition because the component spring parts are non-harmonic, many shocks are readily attenuated merely by reversal of the direction of the excursion of the mount while the body supported on the seat part will experience very little or very low force and remain substantially spatially fixed due to inertia. In the event excursions continue in one direction greater than in a return direction, such as those encountered when traversing a rising grade, for example, a new position of orientation of a person with respect to the mounting means may occur but with relatively little shock force being transferred to the central module of the seat part.

In addition to the mechanical out-of-phase spring damping characteristics, the polyurethane being secured to the module components tends to dissipate energy. Even though shocks are being experienced in a harmonic program of shocks, there will be nodes established at certain indeterminate positions in the biscuit, and other component parts of the module will be caused to function in non-synchronous or non-harmonic manner whereby to dampen such harmonic shocks. It is not intended to limit a module to foamed-in-place polyurethane, however, inasmuch as other plastic and/or fabric construction, and the like, may also be desirable in connection with certain uses of the modules for higher or lower damping and/or seat comfort characteristics.

Consider, for example, the module of the character described in connection with FIGS. 1, 2 and 3, in the presence of shock and vibration forces acting on the mounting bracket 22. The seat bottom may be weight loaded by an occupant to the extent of one-hundred and fifty pounds, for example. This weight may be considered concentrated upon the legs 37 and return bend 38 to calculate the torque in foot-pounds acting upon the torsion legs 28 of the seat bottom module 26. The moment arm may be approximately eight inches, with a resultant torque of one hundred foot-pounds. However, the biscuit 18 is secured to module legs 28, 29, 30, 31 and 36 as well as to the sub-module 35 and the weight is accordingly distributed thereto and therebetween in a non-uniform manner.

In the presence of an upward shock on the mounting bracket 22, the torsion arms will be driven upwardly. Such shock may exist for a fraction of a second, for example, whereafter the motion of the bracket 22 will be reversed. During the shock transient from upward to downward motion of the bracket 22, the following phenomena will exist to greater or lesser extent in the spring-mass system of this modification, as well as in other modifications of this invention.

Side areas of the biscuit 18 secured to the cantilever legs 29 will first receive such shock substantially at its beginning. Such shock may be considered a hard shock and will compress cells in the foamed polyurethane along the sides of the seat bottom part 16, FIG. 1. The weight of the occupant's body, at such seat sides, will have loaded the arms 29 in a manner urging same relatively downwardly and inwardly; and the additional shock affected weight will be distributed through the leg 31 to further urge the leg 29 downwardly. Of course, the torsion legs 28 tend to spatially orient the occupant's points of contact with respect to the mounting bracket 22.

That portion of the occupant's weight distributed adjacent the side legs 29 will tend to cause the legs 28 and 29 to oscillate or vibrate at a time-rate or phase peculiar to the spring constant and the weight and the distance of same from the support bracket 22. The spongy characteristic of the polyurethane, or other broadly functionally similar material, is inherently inhibiting to such forced vibration function, however. Accordingly, hard shocks will tend mainly to move the spongy material and distribute such shocks only at low intensities to the small percentage of hip sides of the body of the occupant adjacent the sides of the biscuit 18.

The front corners of the spring module 26 between the legs 29 and 30 will be subject to the shock transient abovementioned in a modified manner and at an inherently different natural frequency because of the distance thereof to the mounting support bracket 22. These front corners are stressed in a complex torsion-cantilever manner at substantially the longest moment arm with relationship to the bracket 22. These corners are further more or less variably stressed as more or less of the back of an occupant's thigh engages the surface of the biscuit 18. Portions of the biscuit 18 and the sub-module 35 further distribute tension and complex shear forces through these corners.

The shock force will be reacted to at these front corners at a slower time rate and at a different inherent phase than the reaction adjacent at least the rear portions of the side legs 29. A few factors causing this phenomenon are the different areas with regard to weight distribution, the different cross-section of contact of the body of an occupant with the biscuit 18, the random tension and compression characteristics of portions of the biscuit 18, for example, and the rate of recurrence of shock forces in harmonic frequencies.

As the shock force decays, different portions or areas of the module will tend to reverse in sense of reaction force with relationship to the body of the occupant at different time rates. Therefore, even though the vibrations are harmonic, they are highly damped both by out-of-phase damping of the component parts of the spring module as well as by frictional or shear energy dissipation in the biscuit 18.

While I have shown and described in detail presently preferred modifications of this invention, obviously other modifications and adaptations of the principles presented will occur to others skilled in the art. Accordingly, I wish not to be limited in my invention only to the specific modifications shown and described, but by the scope of the following claims.

I claim:

1. A spring module carried on support means for orienting a seat, or the like, with relationship to a surface, comprising a first torsion component fastened to said support means, a first cantilever component extending from said first torsion component at an angle thereto, a second torsion component extending from said first cantilever component, and a second cantilever component extending from said second torsion component having at least a portion extending toward said first torsion component and at an angle to said second cantilever component.

2. A seat-spring module comprising support means adapted for orienting a seat, or the like, with relationship to a surface, a first torsion component extending from said support means, a first cantilever component extending from said first torsion component having at least one portion at an angle thereto characterized by a first frequency of vibration, a second torsion component extending from said first cantilever component, and a second cantilever component extending from said second torsion component having at least a portion at an angle thereto characterized by a second frequency of vibration, said second frequency being non-harmonic with relationship to said first frequency, and a pad of cushioning material in which said module is embedded.

3. A spring module for a seat comprising a support, torsion legs extending in generally opposite directions therefrom, a pair of spaced cantilever legs extending away from said torsion legs substantially normal thereto, a second pair of cantilever legs extending toward each other from said first pair of cantilever legs and a cantilever loop extending from said second pair of cantilever legs toward said first-mentioned torsion legs but terminating short thereof.

4. A spring module for a seat comprising a support, an outer bar loop secured to said support and extending therefrom generally in a plane as a cantilever, and a minor cantilever loop within said bar loop and secured to the portion thereof remote from said support and extending generally in said plane toward the support.

References Cited by the Examiner

UNITED STATES PATENTS

| 1,950,226 | 3/1934 | Cable | 297—305 |
| 2,838,100 | 6/1958 | Follows | 297—421 |
| 2,845,997 | 8/1958 | Waite | 297—457 |
| 3,049,730 | 8/1962 | Wall et al. | 5—351 |
| 3,081,077 | 3/1963 | Sudman | 267—111 |
| 3,083,056 | 3/1963 | Ward | 297—452 |
| 3,088,773 | 5/1963 | Horrocks et al. | 297—445 |

CASMIR A. NUNBERG, *Primary Examiner.*

FRANK B. SHERRY, *Examiner.*